United States Patent

Inoue

Patent Number: 4,479,045
Date of Patent: Oct. 23, 1984

[54] TRAVELING-WIRE ELECTROEROSIVE CUTTING METHOD AND APPARATUS

[75] Inventor: Kiyoshi Inoue, Tokyo, Japan

[73] Assignee: Inoue-Japax Research Incorporated, Yokohama, Japan

[21] Appl. No.: 406,950

[22] Filed: Aug. 10, 1982

[30] Foreign Application Priority Data

Aug. 12, 1981 [JP] Japan .............................. 56-127088

[51] Int. Cl.³ .............................................. B23P 1/08
[52] U.S. Cl. ............................ 219/69 W; 219/69 M; 219/69 D
[58] Field of Search .............. 219/69 W, 69 M, 69 D, 219/69 S, 69 G

[56] References Cited

U.S. PATENT DOCUMENTS 3,699,303 10/1977 Kauffman et al. ............... 219/69 D
4,052,584 10/1977 Reznicék ......................... 219/69 W
4,232,208 11/1980 Buhler ............................. 219/69 W

OTHER PUBLICATIONS

AGIE, "Force Effects in ED-Cutting", pp. 1-10, 6/7/1977.

*Primary Examiner*—M. H. Paschall
*Attorney, Agent, or Firm*—Karl F. Ross; Herbert Dubno

[57] ABSTRACT

A traveling-wire electroerosive machining method and apparatus in which a pressure created by and accompanying electrical machining discharges and tending to deflect the traveling electrode wire away from a straight line path defined between a pair of wire-guide members is compensated for by the machining fluid controlled both as to its direction and pressure. The apparatus shown includes a first sensor for sensing an angularity of the prescribed cutting path advanced by the traveling electrode wire to produce a first signal and a second sensor for sensing the electroerosive machining current passing between the electrode wire and the workpiece to produce a second signal. A control system is designed to maintain, in response to the first signal, the direction of supply of the machining fluid towards a region of the cutting gap immediately behind the advancing electrode wire, thereby laterally forcing the electrode wire against the said pressure tending to deflect while controlling the pressure of supply of the machining fluid in response to the second signal so as to counterbalance the pressure tending to deflect with the controlled fluid supply pressure, whereby to bring the electrode wire substantially into alignment with the aforesaid straight line path.

2 Claims, 4 Drawing Figures

TRAVELING-WIRE ELECTROEROSIVE CUTTING METHOD AND APPARATUS

CROSS REFERENCE TO EARLIER APPLICATION

This application is related to my earlier copending application Ser. No. 245,597 filed Mar. 19, 1981, now U.S. Pat. No. 4,414,456 issued Nov. 8, 1983.

FIELD OF THE INVENTION

The present invention relates generally to traveling-wire electrical machining and, more particularly, to a new and improved method of and apparatus for electroerosively cutting a workpiece with an electrode wire in which the electrode wire stretched under tension between a wire-supply side and a wire-takeup side is axially advanced through the workpiece across a pair of wire-guide members defining a straight-line wire-travel path therebetween, an electroerosion machining current is passed between the traveling electrode wire and the workpiece across a cutting gap flushed with a machining fluid while the workpiece is displaced relative to the straight-line path and transversely thereto to advance electroerosive machining of the workpiece along a prescribed cutting path and the machining fluid into the cutting gap is consecutively renewed to allow consecutive advance of electroerosive machining. The invention relates particularly to a method and apparatus of the type described wherein the machining fluid into the cutting gap is renewed in a novel manner to basically improve performance of the electroerosive wire-cutting process. The term "electrode wire" is used throughout herein to refer to an electrical machining electrode in the form of a wire, tape, ribbon or a like thin, elongate, continuous body.

BACKGROUND OF THE INVENTION

The process of electroerosive traveling-wire or wire-cut machining generally makes use of a continuous electrode wire composed of, say, brass or copper, and having a thickness ranging between 0.05 and 0.5 mm. The continuous electrode wire is axially advanced along a given continuous guide path from a supply means, e.g. a wire-storage drum to a takeup means, e.g. a wire-collection drum through a workpiece disposed in a predetermined cutting zone. A pair of wire-guide members are disposed across the workpiece to define in the cutting zone a straight line path therebetween designed for the electrode wire precisely to travel axially traversing the workpiece.

The cutting gap is flushed with a cutting fluid and electrically energized with a high-density electric current which is passed between the electrode wire and the workpiece to electroerosively remove stock from the workpiece. Advantageously, the cutting fluid is a distilled water liquid or any dielectric medium and the electroerosive machining current is in the form of a succession of electrical pulses which results in a repetition of time-spaced, discrete, localized electrical discharges across the cutting gap. Each individual electrical discharge striking on a random localized area on the workpiece surface acts to impulsively melt and vaporize stock which is dislodged impulsively from that area under a high pressure accompanying the electrical discharge. With machining pulses successively applied across the gap, such electrical discharges are effected repetitively but on varying localized areas, thereby cumulatively removing stock from the workpiece.

As the electroerosive stock removal proceeds, the workpiece is displaced relative to the aforementioned straight line path transversely thereto. This allows the electrode wire which is traveling axially to advance transversely to the workpiece and consequently a cutting slot to be formed behind the advancing electrode wire. The continuous relative displacement along a prescribed path results in the formation of a desired contour corresponding thereto and defined by this cutting slot in the workpiece. To assure a cutting accuracy, it is vitally important that the electrode wire be held axially to travel precisely in alignment with the straight line path and hold its linearity between the wire-guide members across the workpiece.

Heretofore it has been commonly believed that this requirement of linearity of the traveling electrode wire would be inherently met by the provision of traction means, i.e. wire-braking means disposed on the wire-supply side in conjunction with wire-drive means disposed on the wire-takeup side, needed to hold the traveling electrode wire tightly stretched across the wire-guided members of the cutting zone. It has now been recognized, however, that in spite of the effort to tightly stretch the electrode wire with the traction means, the required cutting accuracy is not necessarily obtainable and that a cutting inaccuracy is created in practice by reason of the fact that considerable pressure develops accompanying the electroerosive discharges and tends to deflect or force back the electrode wire traveling axially in the cutting zone. As a result, the traveling electrode wire tends to lag behind the preset straight line path defined by the wire-guide members. This means that at any instant the actual position of the axis of the electrode wire deviates from the preset position relative to the workpiece and the wire axis actually may not precisely follow a prescribed cutting path in the workpiece. Furthermore, it has been found that the magntiude of the electrical discharge pressure and hence the extent of the wire deflection may vary actually from time to time. Thus, when the prescribed cutting path not a single rectilinear path but is as customarily is, curved and/or cornered, the direction and extent of deviation would vary from point to point and eventually the actual contour of cutting would not precisely reproduce the desired contour of cut. It has now also been found that the cutting inaccuracy created in the manner described is even further accentuated when the machining fluid is delivered or forced to flow uncontrolledly or in a customary manner into the cutting gap.

OBJECT OF THE INVENTION

Accordingly, the present invention seeks to provide a novel and improved method of and apparatus for electroerosively cutting a workpiece with a traveling electrode wire whereby the aforemention problems encountered with the conventional arrangements are overcome.

SUMMARY OF THE INVENTION

The present invention is directed in a first aspect thereof to a method of traveling-wire electroerosive machining of an electrically conductive workpiece wherein a continuous electrode wire stretched under tension between a wire-supply side and a wire-takeup side is continuously transported to axially travel along a straight line path defined between a pair of wire-guide members in an electroerosive cutting relationship with the workpiece, a machining fluid is supplied under pressure into a cutting gap between the traveling electrode wire and the workpiece, a succession of electrical machining discharges are effected across the gap to electroerosively remove stock from the workpiece while creating a pressure tending to deflect the electrode wire traveling between the wire-guide members away from the straight line path, and the workpiece is displaced relative to the straight line path and transversely thereto to advance electroerosive stock removals along a prescribed cutting path corresponding to a desired contour of cut to be machined in the workpiece, whereby the actual contour of cut tends to deviate from the desired contour. In accordance with the present invention there is provided an improvement in the method described, which improvement comprises: sensing an angularity of the prescribed cutting path to produce a first signal; sensing the electroerosive machining current passed between the traveling electrode wire and the workpiece to produce a second signal; and maintaining, in response to the first signal, the direction of supply of the machining fluid towards a region of the cutting gap which is immediately behind the electrode wire advancing in the said cutting path, thereby laterally forcing said electrode wire against the said pressure tending to deflect, while controlling the pressure of supply of said machining fluid into the said region in response to the second signal so as to counterbalance said pressure tending to deflect with the said controlled fluid supply pressure, whereby to bring the wire substantially into alignment with the said straight line path.

The present invention in a second aspect thereof is directed to an apparatus for traveling-wire electroerosive machining of an electrically conductive workpiece, having a continuous electrode wire adapted to be stretched under tension between a wire-supply side and a wire-takeup side, means for continuously transporting the electrode wire from the wire-supply side to the wire-takeup side to cause it to travel axially along a straight line path defined between a pair of wire-guide members in an electroerosive cutting relationship with the workpiece, means for supplying a machining fluid under pressure into a cutting gap between the traveling electrode wire and the workpiece, power supply means for effecting a succession of electrical machining discharges across the cutting gap to electroerosively remove stock from the workpiece while creating a pressure tending to deflect the electrode wire traveling between the wire-guide members away from the straight line path, and cutting feed means for displacing the workpiece relative to the straight line path and transversely thereto to advance electroerosive stock removal along a prescribed cutting path corresponding to a desired contour of cut to be machined in the workpiece, whereby the actual contour of cut tends to deviate from the desired contour. In accordance with the present invention there is provided an improvement in the apparatus described, which improvement comprises: first sensing means for sensing an angularity of the said prescribed cutting path to produce a first signal; second sensing means for sensing the electroerosive machining current passed between the traveling electrode wire and the workpiece to produce a second signal; first control means operable in response to the first signal for controlling the supply means so as to maintain the direction of supply of the machining fluid towards a region of the cutting gap which is immediately behind the electrode wire advancing in the cutting path, thereby laterally forcing the electrode wire against the pressure tending to deflect it; and second control means operable in conjunction with the second sensing means for acting on the supply means in response to the second signal to control the pressure of supply of the machining fluid into the said region so as to counterbalance said pressure tending to deflect with said controlled fluid supply pressure, whereby to bring the electrode wire actually traveling between the wire-guide members substantially into alignment with the said straight line path.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
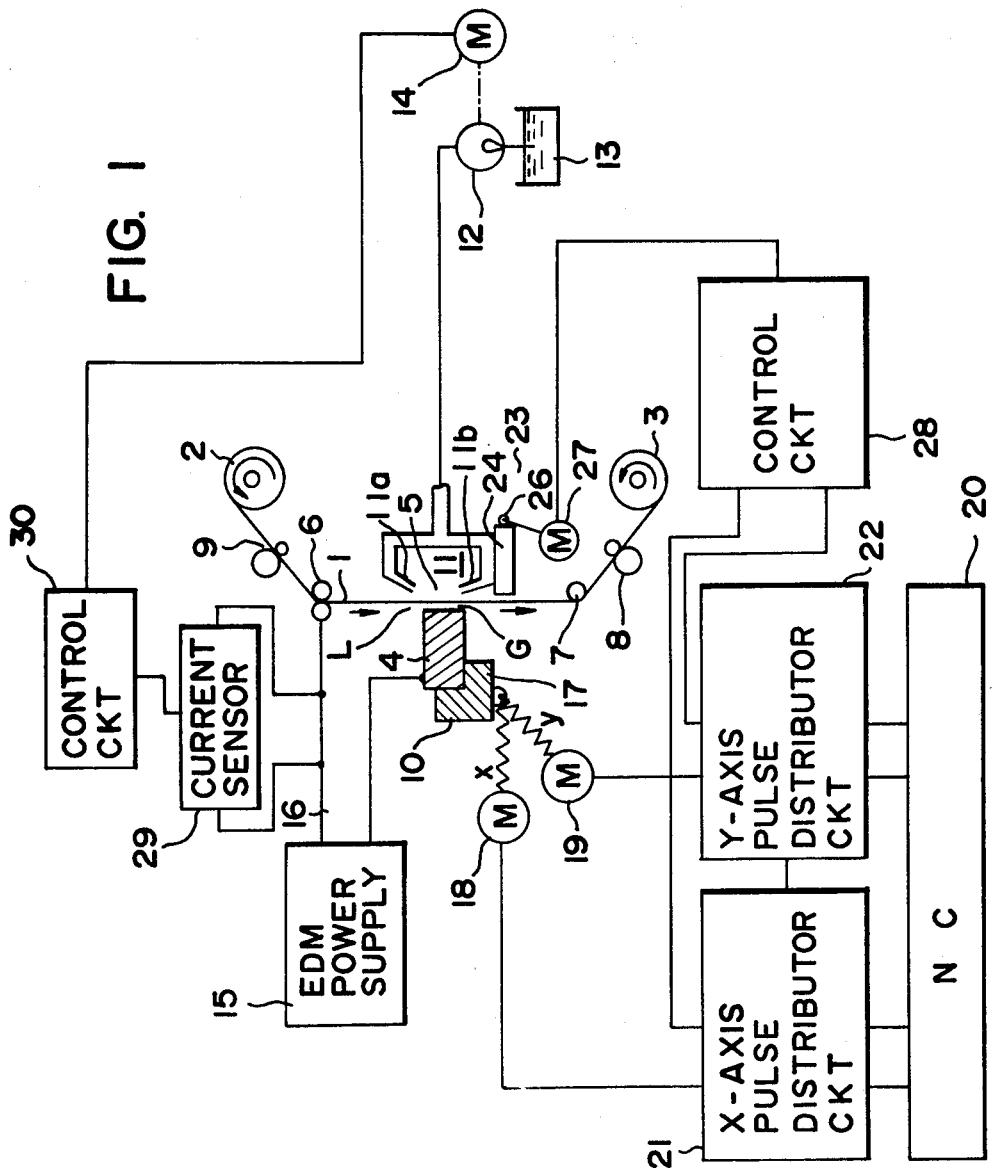
FIG. 1 is schematic view, partly in section, diagrammatically illustrating a traveling-wire EDM arrangement incorporating an embodiment of the present invention.

Referring now to FIG. 1, a continuous electrode wire 1, which is composed of, say, copper or brass and has a thickness ranging between 0.05 and 0.5 mm, is shown fed from a supply drum 2 and wound on a takeup drum 3 while traversing a workpiece 4 disposed in a cutting zone 5 between a pair of wire-guide members 6 and 7. The continuous electrode wire fed from the supply drum 2 is axially advanced by a traction drive unit 8 disposed between the downstream guide member 7 and the takeup drum 3. A braking drive unit 9 is provided between the supply drum 2 and the upstream wire-guide member 6. The traction and braking drive units 8 and 9 are adjustable to cause the electrode wire 1 to axially travel under a desired tension between the guide members 6 and 7 at a desired rate of travel through the workpiece 4. The wire-guide members 6 and 7 are used to provide a straight line path L therebetween through which the electrode wire 1 is caused to travel in alignment therewith in an electroerosive cutting relationship with the workpiece 4 across a cutting gap G. The workpiece is securely mounted on a worktable 10.

A supply unit 11 for machining fluid is, as shown, advantageously constituted by a pair of nozzles 11a and 12b disposed on the upper and lower sides of the workpiece 4, respectively, to direct downwards and upwards into the cutting gap G streams of the machining fluid which is supplied under pressure by a pump 12 from a reservoir 13. The machining fluid may, as is common, be a distilled water liquid having a specific resistance ranging between $10^3$ and $10^5$ ohm-cm. The pump 12 has a rotor which is driven by a motor 14 which is in turn controlledly driven as will be described.

The electrode wire 1 and the workpiece 4 are energized with a succession of electrical pulses supplied from an EDM (electrical discharge machining) power supply 15 of conventional design. These pulses are passed through a power-supply circuit 16 in series with the electrode wire 1 and the workpiece 4 to effect a succession of electrical discharges across the cutting gap G through the machining fluid to electroerosively remove material from the workpiece 4.

The worktable 10 having the workpiece 4 securely mounted thereon is carried on a cross-feed arrangement 17 which includes an X-axis motor 18, e.g. a stepping motor, and a Y-axis motor 19, e.g. a stepping motor. Thus, the worktable 10 is driven by the motors 18 and 19 to displace the workpiece 4 in an X-Y plane transverse to the electrode wire 1 traveling and to the straight line path L defined, between the wire-guide members 6 and 7. The motors 18 and 19 are driven with electrical drive signals furnished from a numerical-control (NC) unit 20 having preprogrammed therein a prescribed contour of cut to be machined in the workpiece 4. The worktable 10 is accordingly driven to displace the workpiece 4 in the X-Y plane so that the axis of the traveling electrode wire guided to align with the straight line path L is transversely advanced along a cutting path defined by the preprogrammed data to advance electroerosive machining along the path in the workpiece 4.

The NC unit 20 has a magnetic tape or any other suitable recording medium on which the information preprogrammed for the desired cutting path is stored. A suitable reproduction means is provided to read out the information and to regenerate feed signals which are applied to pulse distributing circuits 21 and 22 designed to distribute clock pulses from a time base into X- and Y-component drive pulses and to apply them to the stepping motors 18 and 19, respectively, whereby to displace the workpiece 4 so that the straight line path L defined between the wire-guide members 6 and 7 precisely moves effectively along the desired cutting path.

Figure 2:
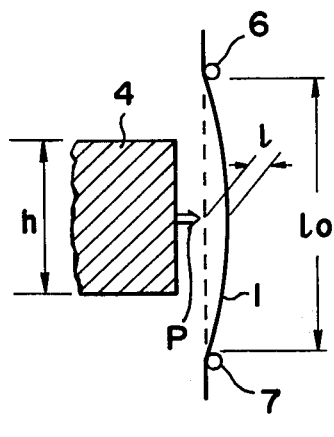
FIG. 2 is a sectional view illustrating development of a pressure tending to deflect an electrode wire in the traveling-wire EDM arrangement.
Figure 3:
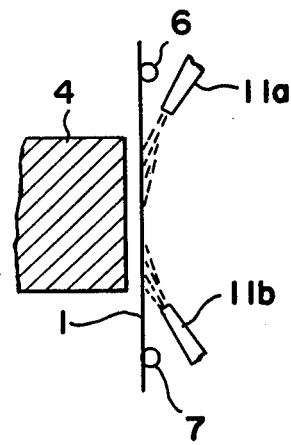
FIG. 3 is a similar view illustrating a pressure-counterbalancing state achieved with the embodiment of the invention.

As previously mentioned, the present invention is based upon a recognition of the adverse effect of pressure created accompanying machining electrical discharges on the cutting precision. As illustrated in FIG. 2, the electrode wire 1 traveling between the wire guide members 6 and 7 tends to bend back due to such a pressure designated by P. It has been empirically determined that the pressure P is expressed by the following formula:

$$P = K_p \cdot I_p \tag{1}$$

where $I_p$ is the peak current of an electrical discharge and $K_p$ is a constant, and that deflection l of the electrode wire 1 shown is expressed by the following formula:

$$l = K_L \cdot \frac{P}{P_o} \left( \frac{l_o^2 - h^2}{l_o} \right) \exp\left(-\frac{x}{v}\right) \tag{2}$$

where $P_o$ is tension on the electrode wire, $l_o$ is the distance between the guide members 6 and 7, h is the thickness of the workpiece 4, v is the workfeed rate, x is the work position and $K_L$ is a constant. Assuming that $P_o$, $l_o$ and h are constant and substituting the formula (1) for P, the formula (2) can be approximated as follows:

$$l = K_L' \cdot I_p \tag{3}$$

where $K_L'$ is a constant. It will be well understandable that deflection l is proportional to the discharge pressure P and eventually to the machining current or energy. It is understood that if an external force F is applied to the electrode wire 1, which compensates for and counterbalances the pressure P, the electrode wire 1 would be brought correctly into alignment with the straight line path L between the wire-guide members 6 and 7 as shown in FIG. 3.

In accordance with the principles of the present invention, the counterbalancing force F is established and maintained throughout a cutting operation by controlling the direction of supply of the machining fluid into the cutting gap G and simultaneously controlling the supply pressure in response to the machining current.

Figure 4:
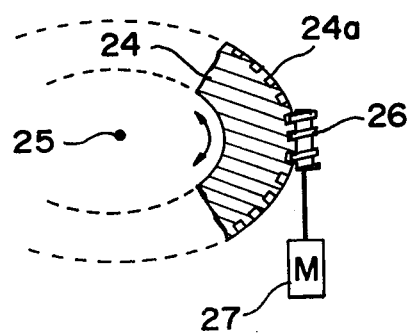
FIG. 4 is a top plan view illustrating a portion of the arrangement of FIG. 1.

Accordingly, in the arrangement of FIG. 1, means 23 is provided which is operative to displace the supply unit or nozzle assembly 11 about the straight line path L so that the streams of the machining fluid issuing from the nozzles 11a and 11b are held directed towards a portion of the cutting gap which is precisely behind the electrode wire advancing along the cutting path. The means 23 is shown to include a carriage 24 which has the nozzle assembly 11 secured thereon and as shown in FIG. 4 is a ring-form turn table rotatable about an axis 25 fixed in position coaxially with the straight line path. The turn table 24 has a geared rim 24a in mesh with a worm 26 rotationally driven by a motor 27. The rotation of the motor 27 is controlled by a control circuit 28 responsive to the NC unit 20 to controlledly turn the nozzle assembly 11 so that the nozzles 11a and 11b are kept oriented towards a region of the cutting gap precisely behind the advancing electrode wire 1. In addition, a current sensor 29 is connected in the machining power supply circuit 16 to monitor the discharge current passing between the electrode wire 1 and the workpiece 4. A control circuit 30 is connected to the sensor 29 and responsive to the sensed discharge current to produce a control signal which is applied to the motor 14 for the pump 12. The pump 12 is thus controlledly driven in response to the discharge current to control the pressure of the machining fluid supplied through the nozzles 11a and 11b into the cutting gap G in accordance with the sensed discharge current.

As long as the electrode wire 1 is advancing along a rectilinear cutting path, the orientation of the nozzles 11a and 11b are maintained with the turn table or carriage 24 fixed in position to hold the streams of the machining fluid directed into a region of the cutting gap G which is precisely behind the advancing electrode wire 1. At the same time, the pump 12 is controlled to supply the streams of the machining fluid towards that region under a variable pressure in accordance with the sensed discharge current. When the electrode wire 1 is to advance along a curved cutting path or a corner of the path defined by two successive rectilinear or curved-line paths connected together, the position of the nozzle assembly 11 is changed instantaneously to maintain the mentioned orientation and the pressure of the streams of the machining fluid supplied through the position-controlled nozzles 11a and 11b into the gap G is varied so as to maintain the counterbalancing relationship with the discharge pressure P.

The control circuit 28 is adapted to receive control signals from X-axis and Y-axis pulse distributors 21 and 22 of the NC unit 20 which signals are applied to the drive motors 18 and 19 for the worktable 10 and thus for the workpiece 4. These signals define a desired contouring path of advance of the workpiece 4 relative to the straight line path L and hence of desired advance of the electrode wire 1 relative to the workpiece 4. The control circuit 28 derives from these signals an "angular" sensing signal which represents an angle of the tangent to the contouring path at each preset point thereon with respect to a predetermined coordinate axis (R.g. X-axis) and, from this "angular" sensing signal, produces an "angular" drive signal to be furnished to the motor 27. Thus, when a change in the direction of advance of the straight line path L occurs in the contouring path, an "angular" drive signal is provided to the motor 27 to rotate the carriage 24 and hence to alter the angular positions of the nozzles 11a and 11b thereon so that the streams of the machining fluid are directed into a region of the cutting gap which is precisely behind the advancing electrode wire 1.

What is claimed is:

1. In a method of traveling-wire electroerosive machining of an electrically conductive workpiece wherein a continuous electrode wire stretched under tension between a wire-supply side and a wire-takeup side is continuously transported axially to travel along a straight-line path between a pair of wire-guide members in an electroerosive cutting relationship with the workpiece, a machining fluid is supplied in a stream under a pressure into a cutting gap formed between the traveling electrode wire and the workpiece, and a succession of electrical machining discharges are effected across said gap to electroerosively remove stock from the workpiece while the traveling-electrode wire and the workpiece are relatively displaced transversely to said straight-line path to advance the electroerosive stock removal along a prescribed non-unirectilinear cutting path corresponding to a desired contour of cut to be machined in the workpiece, the improvement which comprises the steps of:

sensing a machining current passing between the traveling wire and the workpiece during said electrical discharges to produce a signal representing a pressure created in said cutting gap and tending to deflect said traveling electrode wire between said wire-guide members away from said straight line path; and directionally controlling said stream of the machining fluid into said cutting gap so as to maintain said stream always directed into a workpiece region immediately behind the wire advancing, in spite of a change of direction of advance thereof, along said prescribed non-unirectilinear cutting path while simultaneously controlling the pressure of said machining fluid in said direction-controlled stream in accordance with said signal so as to counterbalance said wire-deflecting gap pressure, whereby to maintain said traveling electrode wire substantially in alignment with said straight line path.

2. In an apparatus for traveling-wire electroerosive machining of an electrically conductive workpiece, having a pair of wire-guide members for defining a straight-line path therebetween along which a continuous electrode wire stretched under tension between a wire-supply side and a wire-takeup side is to be continuously transported so as to axially travel in an electroerosive cutting relationship with the workpiece, fluid supply means including nozzle means for supplying a machining fluid in a stream under pressure into a cutting gap formed between the traveling electrode wire and the workpiece, electrical power supply means for effecting a succession of electrical machining discharges across said gap to electroerosively remove stock from the workpiece and cutting feed means for relatively displacing the traveling electrode wire and the workpiece transversely to said straight-line path to advance the electroerosive stock removal along a prescribed nonunirectilinear cutting path corresponding to a desired contour of cut to be machined in the workpiece, the improvement which comprises:

detector means for sensing a machining current passing between the traveling wire and the workpiece during said electrical discharges to produce a signal representing a pressure created in said cutting gap and tending to deflect said traveling electrode wire between said wireguide members away from said straight-line path;

first control means for rotationally displacing said nozzle means about said straight-line path to directionally control said stream of the machining fluid into said cutting gap so as to maintain said stream always directed into a workpiece region immediately behind the wire advancing, in spite of a change of direction of advance thereof, along said prescribed non-unirectilinear cutting path; and second control means associated with said fluid supply means for controlling the pressure of the machining fluid in said direction-controlled stream in accordance with said signal so as to counterbalance said wire-deflecting gap pressure, whereby to maintain said traveling electrode wire substantially in alignment with said straight-line path.

* * * * *